June 4, 1935. J. H. LITTLE 2,003,807

ILLUMINATION OF INSTRUMENT DIALS

Filed Jan. 29, 1934

Inventor
John H. Little
By Blackmore, Spencer & Flint
Attorneys

Patented June 4, 1935

2,003,807

UNITED STATES PATENT OFFICE 2,003,807

ILLUMINATION OF INSTRUMENT DIALS

John H. Little, Detroit, Mich., assignor to General Motors Corporation, Detroit, Mich., a corporation of Delaware Application January 29, 1934, Serial No. 708,750

3 Claims. (Cl. 240—8.16)

This invention has to do with the illumination of such objects as the dials of instruments, and is particularly concerned with the illumination of the dials of the various instruments usually provided on the instrument board of automobiles.

Heretofore it has been customary to make instrument dials in the form of flat sheets and disks, and to illuminate them by means of sources of light arranged at one or both sides of the instrument. The result of this was that much more light fell upon the portion of the dial close to the source with the result that the lighting was uneven and unattractive, and the characters on the dial were not as clearly readable as is desired. Attempts have been made to correct this by employing several light sources illuminating the dial from different angles; or by providing reflectors to accomplish the same result from a single source. Another attempt at correction consisted in tilting the dial toward the source so that the more remote portions of it would receive more light. While these changes produced a certain amount of improvement in light distribution, nevertheless uneven lighting has remained.

My invention consists in so shaping the dial that all portions of it will receive substantially the same amount of light from a source properly located at one side of it. I have found the best shape to give it is to dish it and that the best place to put the indicia is on the inclined edges of the dish. The light source is then arranged at one side of the dial so that the adjacent portion of the dial subtends a very small angle measured from the source and consequently receives little illumination while the center of the dial receives full illumination. The indicia on the opposite dished edge of the dial receives more light than in present constructions because it is tilted toward the source. Obviously, if desired, a portion of the improved result may be obtained by dishing one edge only of the dial.

Figure 1:
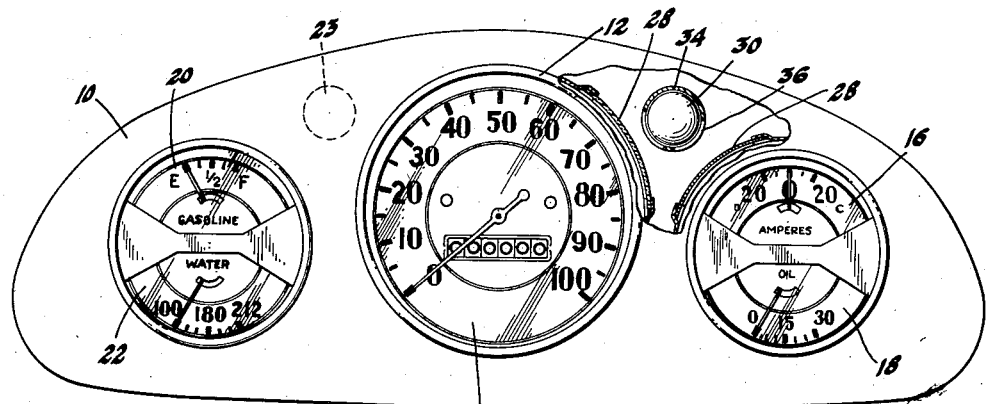
Figure 1 is a front elevation of an instrument panel, partly in section, showing my improved dials and method of illuminating them.
Figure 2:
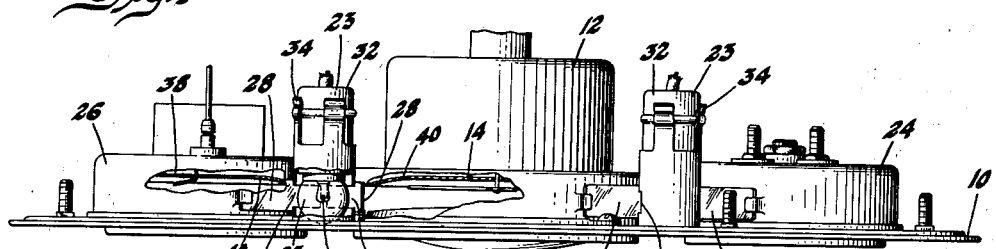
Figure 2 is a top plan view of the panel shown in Figure 1.

10 indicates an instrument panel of conventional construction to which are suitably secured a number of instruments. The central instrument 12 is the speedometer and its dial is indicated by numeral 14. At the right of the speedometer are the ammeter and oil gauge, the dials of which are indicated at 16 and 18, respectively. At the left of the speedometer are the gasoline gauge and the temperature indicator, the dials of which are indicated at 20 and 22. The ammeter and oil gauge are contained in a unitary housing 24, while the gasoline gauge and water temperature indicator are inclosed in a common housing 26. The housings 24 and 26 are each provided on the sides toward the light sources 23 with apertures covered by windows 28 of translucent or transparent material. The housing of the speedometer 12 is likewise provided on the sides toward the light sources with windows 28. Each light source may take the form of a conventional incandescent lamp 30 having socket 32 held in place by clip 34 fastened to the rear of the instrument panel. The clip 34 is cut away as at 36 to permit the projection of light from the lamp through the windows onto the dials of the instruments.

Figures 3, 4:
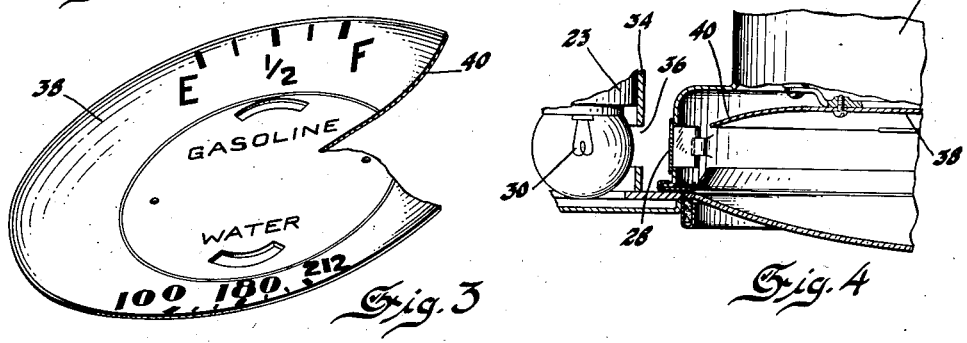
Figure 3 is a view of one of the dials.
Figure 4 is an enlarged section corresponding to part of Figure 2.

A combined dial, such as may be used for the gasoline gauge and the water temperature indicator, is indicated at 38 in Figure 3. It will be noted that the dial takes the form of a dished disk and that the indicia is on the inclined edges of the disk.

Figure 5:
Figure 5 shows diagrammatically the method of illumination applied to three dials lighted by means of two sources.

In Figures 4 and 5 there is shown in greater detail the method of illumination of the dial. Referring to Figure 4, it will be seen that the light from the filament 30 is projected through the window 28 onto the dial 38, and by tracing the arrows of Figure 5, the character of the direct illumination from the filament will be apparent. It will be noted that the filament itself is substantially in line with the inclined edge 40 of the dials. While theoretically the dished edge adjacent the light source would receive hardly any light from it, in practice, it is found that it receives ample illumination. The actual fact is that the source of light is not the theoretical point assumed by the arrows in Figure 5, but is of considerable dimensions, and this, together with the incidental reflection from the surfaces of the glass bulb, provides ample light.

This method of illumination may also be explained on the basis of the number of lumens of light thrown upon the respective indicia bearing portions of the dial. While the dished edge remote from the light sources is tilted in a direction to receive more light than the dished edge near the light source, when one considers the spherical angles subtended by the respective indicia, it will be noted that substantially the same amount of light is cast upon each of the indicia bearing portions of the dial.

In actual use it has been found that by this method a very pleasing illumination can be obtained, the effect being so even that the observer often fails to note the absence of the glass covering the dial.

I claim:

1. The combination of an instrument dial having oppositely inclined edges bearing indicia and a light source at one side of the dial substantially in line with one of said side portions and arranged so that corresponding portions on opposite sides of the dial receive substantially equal amounts of illumination.

2. The combination of a support, an instrument mounted on the support and having a dished dial provided with indicia on the inclined edges thereof, a light source at one side of the dial and slightly in advance of an imaginary extension of an inclined edge of the dial so that corresponding portions of the opposite sides of the dial receive substantially equal amounts of illumination, and means for concealing the source from view.

3. The combination of an instrument panel having an opening therein, an instrument mounted on the panel having its dial in registration with said opening, but spaced rearwardly from the opening, said dial being dished and having indicia on the inclined edges thereof, and a light source at the rear of the panel, to one side of said dial and slightly in advance thereof so that corresponding portions of the opposite sides of the dial receive substantially equal amounts of illumination.

JOHN H. LITTLE.